United States Patent [19]

Lim

[11] Patent Number: 4,567,119

[45] Date of Patent: Jan. 28, 1986

[54] NICKEL-HYDROGEN BIPOLAR BATTERY

[75] Inventor: Hong S. Lim, Agoura, Calif.

[73] Assignee: Hughes Aircraft Company, El Sequndo, Calif.

[21] Appl. No.: 588,620

[22] Filed: Mar. 12, 1984

[51] Int. Cl.[4] .......................................... H01M 10/36
[52] U.S. Cl. ........................................ 429/59; 429/72; 429/101; 429/120; 429/210
[58] Field of Search ...................... 429/101, 57, 27, 26, 429/120, 72, 152, 40, 42, 44, 34, 59, 210, 206, 223

[56] References Cited

U.S. PATENT DOCUMENTS

| | | | |
|---|---|---|---|
| 3,728,158 | 4/1973 | Poe et al. | 429/210 X |
| 3,990,910 | 11/1976 | Giner et al. | 429/59 |
| 4,098,962 | 7/1978 | Dennison | 429/101 |
| 4,115,630 | 9/1978 | Ommering et al. | 429/72 |
| 4,117,206 | 9/1978 | Plust et al. | 429/101 |
| 4,127,703 | 11/1978 | Holleck | 429/57 |
| 4,215,184 | 7/1980 | Gutmann et al. | 429/101 |
| 4,327,158 | 4/1982 | Holleck | 429/101 |
| 4,478,918 | 10/1984 | Ueno et al. | 429/26 X |

*Primary Examiner*—Anthony Skapars
*Attorney, Agent, or Firm*—John A. Sarjeant; A. W. Karambelas

[57] ABSTRACT

A nickel-hydrogen bipolar battery comprises a plurality of unit cells organized in assemblies wherein the assemblies are stacked and positioned within a hydrogen space. Each unit cell includes a porous hydrogen electrode loaded on its lower surface with a platinum catalyst layer. Adjacent the platinum loaded lower surface of the porous hydrogen electrode lies a separator. A nickel electrode lies against the separator opposite the surface adjacent to the platinum loaded surface. One or more openings through the nickel electrode and separator cooperate to permit oxygen gas, generated at the nickel electrode, to reach to the hydrogen electrode of the same unit cell. Recombination of hydrogen gas and oxygen gas occurs at the hydrogen electrode platinum catalyst layer. The assembly provides serial connection of the unit cells through conductive end plates for axial current flow through the assembly stack.

18 Claims, 2 Drawing Figures

NICKEL-HYDROGEN BIPOLAR BATTERY

BACKGROUND OF THE INVENTION

1. Field of the Invention

This invention relates generally to nickel-hydrogen batteries and more particularly to a nickel-hydrogen battery having a bipolar structure.

2. Description of the Prior Art

A typical prior art nickel-hydrogen battery comprises a hydrogen gas filled pressure vessel in which a single or a pair of cells are located. Each cell has a positive nickel electrode spaced apart from a negative hydrogen electrode. A separator is located between the nickel and hydrogen electrodes. Each separator is sufficiently thick to prevent electrical shorting between the electrodes. In addition, each separator holds electrolyte therein to allow an electro-chemical reaction to occur in the cell. Generally, the electrolyte is an aqueous alkaline solution, preferably a solution of potassium hydroxide.

During the normal charging cycle and during overcharging, oxygen gas is produced in the cell by the electrolysis of water in the electrolyte. This oxygen must be recombined with the pressure vessel hydrogen gas to form water within the cell to prevent the build up of oxygen gas pressure and a drying out of the separator. A build up of oxygen gas pressure may cause a breach in the pressure vessel structure. Separator dryout can lead to reduction in cell performance and a shortened cell lifetime.

Typically, pairs of cells are arranged with the nickel electrodes in a back to back configuration. This is illustrated in U.S. Pat. No. 4,115,673, issued to Van Ommering et al, and U.S. Pat. No. 4,127,703, issued to Holleck. The Van Ommering et al patent describes a stack of cells wherein a cell pair, or module, is separated from an adjacent module by a module separator. The module separator prevents electrolyte contact between adjacent modules and the cells contained within the adjacent modules. The Holleck patent also describes a back to back arrangement of cell pairs. The Holleck patent includes an electrolyte reservoir and a microporous hydrophobic membrane beteween the back to back electrodes. The membrane permits gas and vapor to flow therethrough while being impermeable to the liquid electrolyte. In the back to back cell arrangement, there is an exchange or sharing of water between the cells during the charging and discharging of the cells. This exchange or sharing of water occurs through the electrolysis and oxygen-hydrogen recombination phases.

The Holleck patent further describes a cell stack wherein a single positive configuration is used. In this configuration there is transport of oxygen gas evolved in one cell to an adjacent cell where it is recombined. This arrangement leads to oxygen gas transport in a single direction. Holleck provides for returning the oxygen at one end through a return conduit to the other end for oxygen-hydrogen recombination. This oxygen return scheme prevents an asymmetric buildup of water in the cell stack. Thus, this single positive configuration also results in the exchange of water between cells.

U.S. Pat. No. 3,975,210, issued to Warnock, also describes a plurality of paired cells within a single pressure vessel. To accommodate the paired cells in the pressure vessel, each cell pair is contained with an individual compartment or module. The modules are constructed to permit hydrogen gas flow into the module but restricts electrolyte from leaving. Therefore, the loss of electrolyte and water from the module is minimized. However, the cell pair shares water in the module as does the previously described prior art patents.

In each of the previously described prior art patents, the nickel electrodes are electrically connected in parallel. In addition, the hydrogen electrodes are also electrically connected in parallel. Each electrode has a tab which is then connected to a busbar for the respective nickel or hydrogen electrodes. These tabs and busbars have the inherent disadvantage of adding additional weight to the battery structure.

A nickel-hydrogen battery having a bipolar cell configuration alleviates the need for electrode connecting tabs and busbars. By eliminating electrode tabs and busbars, significant weight savings can be obtained in a large system.

In a bipolar cell configuration, a plurality of individual cells are stacked such that a first cell's nickel electrode is in electrical contact with an adjacent second cell's hydrogen electrode. Thus, current is permitted flows axially through the cell stack during the charging and discharging of the battery.

In a bipolar cell configuration, electrolyte must be contained within each individual cell to prevent electrolyte bridging between cells. Electrolyte bridging would result in parasitic shunt currents, thus limiting the performance of the battery. Therefore, in a bipolar battery, careful water management is required to prevent electrolyte bridging and separator dry out. This requires that oxygen gas generated by electrolysis of the water in the electrolyte during charging and overcharging, to be combined within the same cell. However, no proper solution for water control on an individual cell basis has been demonstrated in the prior art.

SUMMARY OF THE INVENTION

This invention is directed to a nickel-hydrogen battery containing a plurality of individual cells stacked in a bipolar structure. Individual cells are electrically connected in series, rather than in parallel, within the battery to make a true bipolar construction.

Furthermore, each individual cell includes a mechanism to recombine all oxygen evolved at the nickel electrode before the oxygen leaves the individual cell compartment. This mechanism is characterized by each unit cell having cooperating openings through the positive electrode and separator. The electrode and separator openings permit gaseous oxygen, evolved at the positive electrode, to reach the negative electrode within the same cell. Upon reaching the negative electrode, the oxygen gas recombines with hydrogen gas in the cell to form water.

Additionally, each individual cell includes a mechanism to minimize electrolyte bridging between adjacent cells. Electrolyte bridging between adjacent cells results in undesirable parasitic shunt currents within the battery. Parasitic shunt currents limit the performance, especially, a long-life performance of a bipolar battery. This mechanism is characterized by each unit cell having electrolyte-non-wettable polymer frames in order to prevent electrolyte bridging between adjacent cells.

In accordance with the invention, disclosed herein is a nickel-hydrogen battery having a pressure vessel containing hydrogen gas and a plurality of unit cells therein. The unit cells are stacked adjacent one another in a bipolar configuration to allow axial current flow through the stack of unit cells. Each unit cell defines a unit cell space with a nickel electrode and a hydrogen electrode being disposed within the unit cell space. A separator is disposed within the unit cell space between the nickel electrode and hydrogen electrode. Electrolyte is contained in the unit cell space about these electrodes and the separator. Furthermore, a means for allowing oxygen gas, generated at the nickel electrode, to reach the hydrogen electrode is provided. Oxygen gas when recombined with the hydrogen gas at the hydrogen electrode forms water within the unit cell space.

It is thus a purpose and advantage of this invention to provide a nickel-hydrogen bipolar battery containing novel structural features which permit oxygen gas, generated within each unit cell to pass to a hydrogen electrode located within the same unit cell for recombination therein, thus preventing water maldistribution. Furthermore, the nickel-hydrogen bipolar battery contains unit cell structural features which prevent electrolyte bridging between unit cells thus eliminating undesirable parasitic currents and ion migration.

It is a further purpose and advantage of this invention to provide a nickel-hydrogen bipolar battery which can be formed with a plurality of adjacently stacked unit cells. Each unit cell within the battery contains its own electrolyte and shares with the other unit cells only through the gaseous hydrogen.

It is another purpose and advantage of this invention to provide an improved nickel-hydrogen bipolar battery wherein each unit cell is structured so that it can be stacked adjacent another unit cell for direct contact therewith. A series stack of unit cells electrically conduct in a direction through the electrodes, rather than radially of the electrodes, thereby increasing the electrical efficiency of the battery.

It is another purpose and advantage of this invention to provide a nickel-hydrogen battery which presents significant savings in weight. The bipolar structure permits the elimination of electrode tabs and busbars which add weight to the battery. In applications where battery weight is critical, the bipolar structure is advantageous over prior art structures.

Other purposes and advantages of this invention will become apparent from a study of the following portion of the specification, claims, and drawings.

DETAILED DESCRIPTION OF THE INVENTION

Figure 1:
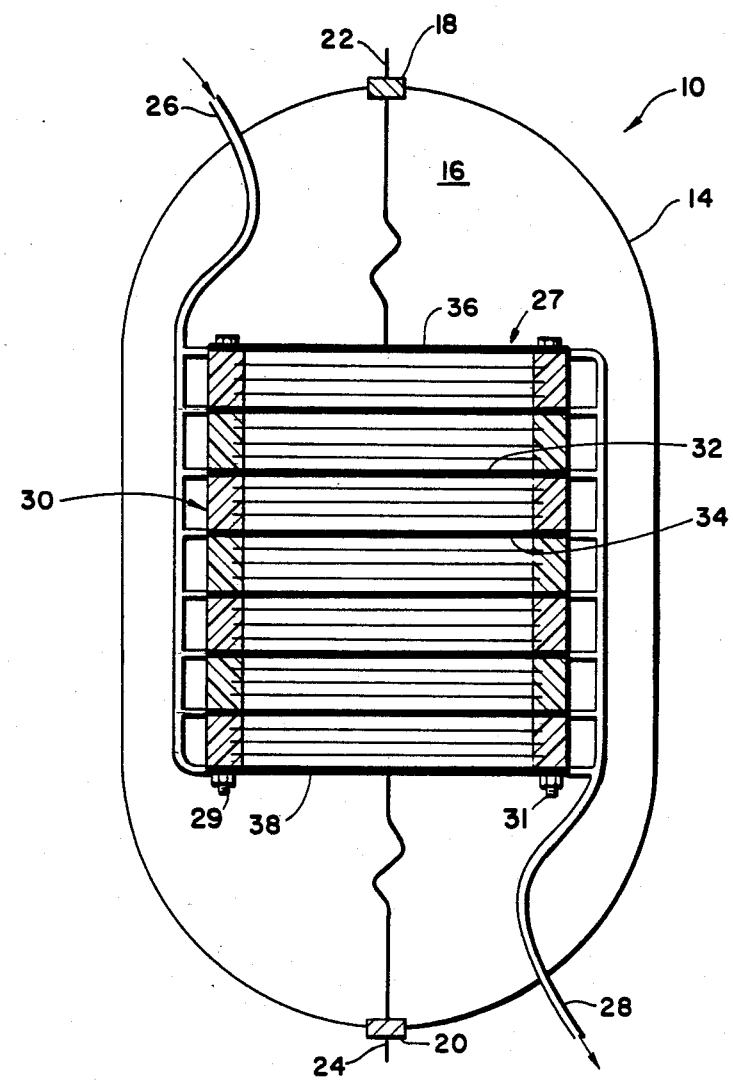
FIG. 1 is an axial section through a nickel-hydrogen battery employing the nickel-hydrogen bipolar battery cells of this invention.

FIG. 1 shows battery 10 containing a plurality of nickel-hydrogen bipolar battery cells. Battery 10 is housed in battery housing 14 which is a pressure vessel having hydrogen space 16 therein. Housing 14 has electrical lead throughs 18 and 20 through which negative and positive electrical leads 22 and 24 respectively pass. As an additional option, coolant fluid, for cooling the battery cells, may pass in and out of the housing through coolant fluid tubes 26 and 28.

Battery 10, as shown in FIG. 1, illustrates an assembly stack 27 which is comprised of a plurality of unit cell assemblies stacked adjacent each other and held in position by through bolts such as through bolts 29 and 31. One of the many assemblies, assembly 30, is indicated in FIG. 1 and again in greater detail in FIG. 2.

Each assembly generates heat during the electrochemical battery action. Therefore, to remove heat from the assembly, and the battery in general, an optional means for heat removal can be provided. The heat removing means comprises cooling plates located between each assembly wherein coolant fluid passes from the coolant tubes. Thus, each of the adjacent assemblies are separated by cooling plates, such as cooling plates 32 and 34 used by assembly 30 and the assemblies adjacent assembly 30. Cooling plates are thus located at the top and bottom of each assembly. The cooling plates have coolant passages therethrough and are connected to coolant fluid tubes 26 and 28. Heat, generated by the unit cells in each assembly, is carried out of the battery when coolant fluid passes through each assembly via coolant fluid tube 26; cooling plates, such as cooling plates 32 and 34, and coolant fluid tube 28. Other heat extraction means can be employed depending on the amount of the heat load and the character of the heat sink. Since the cooling plates, such as cooling plates 32 and 34, are at different potentials, the coolant fluid tubes must be electrically insulated from the cooling plates to prevent electrical shorting between the individual cooling plates. Therefore, the coolant fluid tubes must have sections constructed of dielectric tubing or other electrically insulating means well known to those skilled in the art. In addition, the coolant fluid itself may be dielectric in nature to assure adequate electrical insulation between cooling plates thereby preventing electrical shorting between the cooling plates.

On assembly stack 27, an assembly first end plate, positioned on the top of assembly stack 27 and defined as the assembly top plate 36, acts as the battery negative electrical collector. Negative electrical lead 22 is electrically connected to assembly top plate 36. Similarly, an assembly second end plate, positioned on the bottom of assembly stack 27 and defined as assembly bottom plate 38, serves as the positive electrical collector. Positive electrical lead 24 is electrically connected to assembly bottom plate 38. Through bolts 29 and 31 and other portions of the battery which contact the unit cells or assemblies are of a dielectric nature to eliminate shorting. Assembly top plate 36 and assembly bottom plate 38 may be constructed as cooling plates to aid in cooling of the assembly upon which they are mounted.

Figure 2:
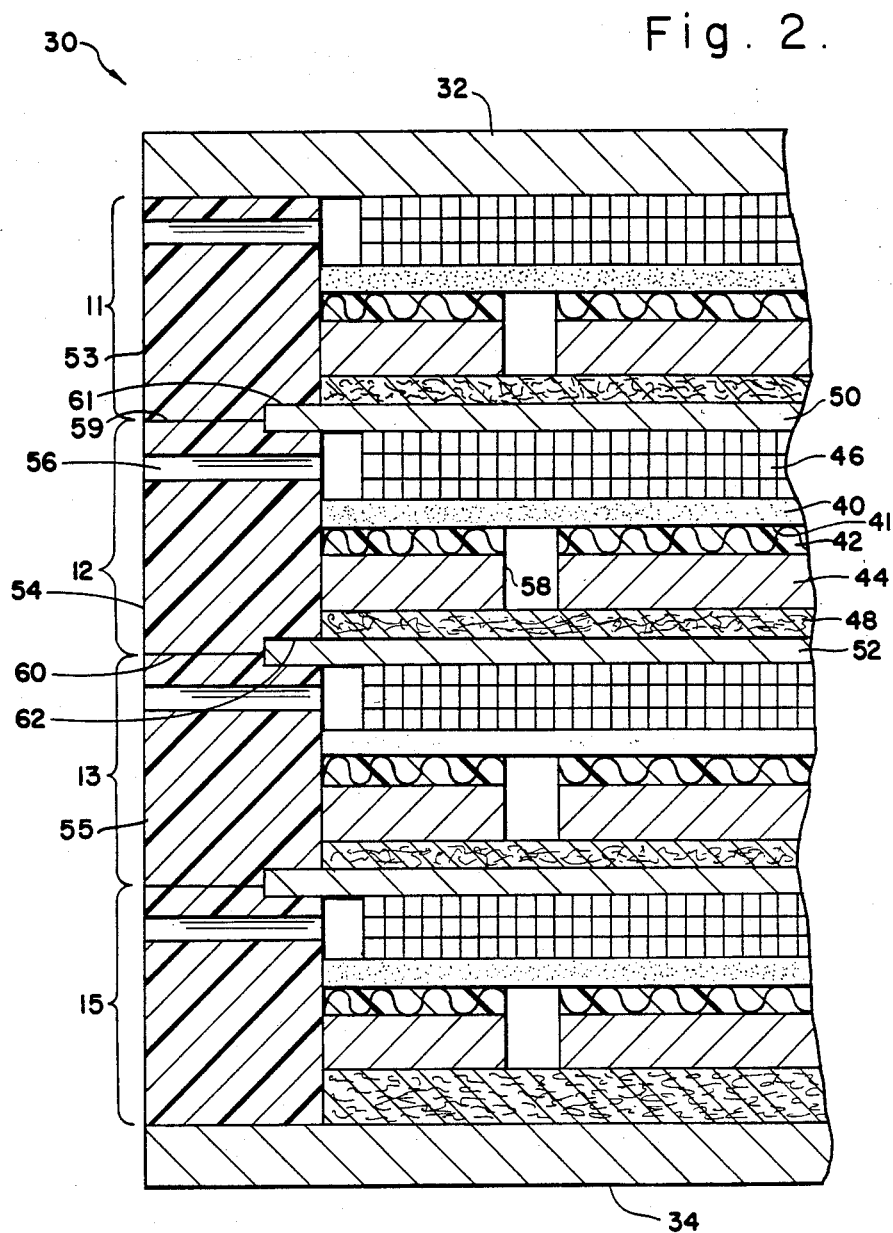
FIG. 2 is an axial section through a stack of four unit cells, with each of the unit cells being formed in accordance with this invention.

As illustrated in FIG. 2, assembly 30 comprises a plurality of identical unit cells 11, 12, 13, and 15 respectively stacked on top of each other. The four unit cells stacked between cooling plates 32 and 34 in FIG. 2 are illustrative of the assembly unit cell stacking arrangement. Assembly 30 is defined in the number of unit cells stacked therein by the cooling requirements of the assembly. More unit cells could be stacked together in assembly 30 between cooling plates 32 and 34 if the cooling requirements were less severe. Conversely, fewer unit cells in assembly 30 would be stacked together between cooling plates 32 and 34 if the cooling requirements were more severe.

The internal structure of a single unit cell, unit cell 12 for example, comprises hydrogen electrode 40 and nickel electrode 44 separated by separator 42. Nickel electrode 44 and separator 42 have one or more complementary openings axially through their structure. Furthermore, gas screen 46 is positioned above hydrogen electrode 40 and porous conductor 48 is positioned below nickel electrode 44. These unit cell elements are then constrained by unit cell first and second end plates which can be respectively defined as unit cell top end plate 50 and unit cell bottom end plate 52.

Battery 10 is illustrated as being cylindrical, with both FIGS. 1 and 2 being diametric sections taken along the axis. The unit cells are defined by dielectric constraining rings stacked together between unit cell top and bottom end plates. Constraining ring 54 is cylindrical in vector and acts as a frame for constraining unit cell 12. Similar rings surround the adjacent unit cells 11, 13 and 15. Each ring has interior and exterior radial walls. These rings, constructed of a dielectric material, are stacked up and held together by dielectric through bolts such as through bolts 29 and 31. Unit cell top and bottom end plates 50 and 52, respectively, are on top and bottom of constraining ring 54. When the stack is clamped together, forming assembly 30, unit cell top and bottom end plates 50 and 52 in conjunction with constraining ring 54 form walls defining a unit cell space. In unit cell 12, hydrogen vent 56 extends through constraining ring 54 from the constraining ring's exterior wall at hydrogen space 16 and opens through the constraining ring's interior wall at the unit cell space adjacent gas screen 46.

Considering the individual parts of each unit cell, it is seen that they are cylindrical in nature to fit within the circular unit cell spaced defined by constraining ring 54. This cylindrical-shaped stack is only one possible design while stacks of other shapes can be designed by one skilled in the art.

Nickel electrode 44 is comprised of nickel oxide or a suitable hydroxide active material. This electrode may be sintered or of other types well known in the art. Nickel electrode 44 includes openings through its structure from its top and bottom surfaces, such as opening 58 in FIG. 2. The preferred electrode opening size is in the range from about 10 micrometers to 3 millimeters for efficient oxygen gas passage therethrough. Therefore, oxygen gas generated at the porous conductor 48 side of nickel electrode 44 can pass to separator 42 and hydrogen electrode 40 for recombination with hydrogen gas at hydrogen electrode 44.

Separator 42 is a woven or mat structure comprising an alkali-stable material which holds electrolyte. An ideal class of materials for separator 42 includes the polymer reinforced zirconia fabrics. The preferred zirconia fabric is ZIRCAR ("ZIRCAR" is a tradename for a zirconium oxide fabric manufactured by Zircar Corp. of Florida, N.Y.). Examplary separator materials are described in H. S. Lim, U.S. Pat. No. 4,233,347; H. H. Rogers, U.S. Pat. No. 4,262,061; H. S. Lim and S. A. Verzwyvelt, U.S. Pat. No. 4,269,913; and S. A. Verzwyvelt, U.S. Pat. No. 4,308,325. Separator 42 has openings therethrough from its top and bottom surfaces, such as opening 58 in FIG. 2 to allow oxygen gas to pass therethrough from nickel electrode 44 to hydrogen electrode 40. The preferred separator opening size is in the range from about 10 to 100 micrometers for efficient oxygen gas passage therethrough. Separator 42 may also be comprised of a porous material which would permit oxygen gas to flow therethrough from nickel electrode 44 to hydrogen electrode 40 without specifically designated openings in the separator.

Hydrogen electrode 40 is comprised of a porous material having an electrolyte-wettable side, with platinum catalyst 41 thereon, and a porous electrolyte-nonwettable side for hydrogen gas access. Graphite is an example of a suitable material of which hydrogen electrode 40 may be fabricated. The electrolyte-wettable side of hydrogen electrode 40 faces separator 42, and the electrolyte-nonwettable side faces gas screen 46.

Gas screen 46 is an electrically conductive and gaseous hydrogen conductive structure, such as a nickel mesh. The area in which gas screen 46 lies, between unit cell top end plate 50 and hydrogben electrode 40, is defined as the unit cell hydrogen gas space. Gas screen 46 is in physical contact with both the nonwettable side of hydrogen electrode 40 and with unit cell top end plate 50. Gas screen 46 permits hydrogen gas to pass in and out of hydrogen vent 56 from hydrogen space 16 to the unit cell hydrogen gas space. Gas screen 46 also provides electrical contact between hydrogen electrode 40 and unit cell top end plate 50.

Nickel electrode 44 is separated from unit cell bottom end plate 52 by means of porous conductor 48. Porous conductor 48 is an electrically conductive structure which may be constructed of nickel felt or nickel mesh. Porous conductor 48 is in electrical contact with nickel electrode 44 and unit cell bottom end plate 52 to provide electrical contact therebetween. Porous conductor 48 also serves as an electrolyte reservoir for storing excess electrolyte within the unit cell. This extra electrolyte is the excess over that which fills the pores of the electrodes and separators. This excess electrolyte is needed for a long-life cell in which the nickel electrode expands as it is cycled and thereby requiring an additional amount of electrolyte to fill newly formed pores within the nickel electrode. In addition, porous conductor 48 serves as an oxygen gas passage to opening 58 by which oxygen, evolved from nickel electrode 44 away from opening 58, may pass through to opening 58. The unit cell space located between hydrogen electrode 44 and unit cell bottom end plate 52 is defined as the electrolyte reservoir space because it is in this space that the electrolyte is contained.

Unit cell top and bottom end plates 50 and 52 are constructed of an electrically conductive material to permit axial current flow between adjacent unit cells. One such material that these end plates may be constructed from is nickel. Unit cell top and bottom end plates located at the ends of an assembly may be constructed such that they serve as cooling plates in addition to serving as unit cell end plates. For example, cooling plates 32 and 34 serve as unit cell end plates while providing the cooling feature for the assembly. Cooling plates 32 and 34 are also constructed of an electrically and thermally conductive material. As discussed earlier, the cooling plates also contain coolant fluid tubes therein which must be electrically insulated from the cooling plate itself. Therefore, cooling plates may be constructed from nickel using a dielectric or electrically non-conductive material to insulate the coolant fluid tubes.

It is important to the battery of this invention that there be a means for allowing oxygen to return from nickel electrode 44 to hydrogen electrode 40 within the same unit cell. One way of accomplishing this is to provide an opening from porous conductor 48 through nickel electrode 44 and separator 42 directly to hydrogen electrode 40. One such opening, opening 58, is illustrated, and there is preferably a plurality of such communicating openings across the lateral expanse of separator 42 and nickel electrode 44. Opening 58 through separator 42 is not needed when a gas permeable separator is provided. The purpose of opening 58 is to provide a oxygen return path from nickel electrode 44 back to hydrogen electrode 40 where the oxygen is recombined, by platinum catalyst 41, with the gaseous hydrogen. Upon oxygen-hydrogen recombination, water is formed. It is desirable to confine this water within the unit cell in order to prevent water migration from one unit cell to the other. Water migration from one unit cell to another may lead to drying out of the electrolyte with a unit cell thereby destroying the electromchemical battery action. In addition, the oxygen-hydrogen recombination prevents the oxygen from entering hydrogen space 16.

The electrolyte within separator 42, in and around nickel electrode 44, and in porous conductor 48 is, preferably, an aqueous solution of potassium hydroxide, KOH.

The electrochemical reaction at nickel electrode 44 is shown by the following relationship:

The specific chemical reaction which produces the electrons is the valence change, between the two and three states, of the nickel hydroxide in nickel electrode 44. The electrochemical reaction at the hydrogen electrode is shown by the following relationship:

When these formulas are summed together, the simplified and generalized cell reaction is as follows:

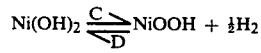

Oxygen, generated in each unit cell at nickel electrode 44 by electrolysis of the water in the aqueous electrolyte during the charging cycle, must be controlled, i.e. oxygen-hydrogen recombination, within the same unit cell of the bipolar battery. This same unit cell oxygen-hydrogen recombination is required in order to prevent imbalance water distribution among unit cells which can cause performance imbalance among the unit cells. By way of illustration, in unit cell 12 all oxgyen evolved at nickel electrode 44 collects and passes through opening 58 in nickel electrode 44 and separator 42 to hydrogen electrode 40. Hydrogen electrode 40, with platinum catalyst 41 thereon, provides an excellent media for oxygen recombination with gaseous hydrogen within the unit cell. Thus, all oxygen will be combined before it can reach hydrogen vent 56.

The confining and recombination of oxygen within the unit cell is important for long-life operation of the cell. If oxygen were to leave the unit cell and recombine in another location, water would effectively be transferred out of the unit cell into another unit cell. Water transfer between unit cells would result in electrolyte management problems, such as abundance of water in certain cells and a lack of water in other cells. If a unit cell lacks a sufficient amount of water therein, the dried-out cell would be unable to support the required electrochemical reaction.

Another feature of the invention is the design of constraining ring 54 which minimizes the electrolyte bridging between adjacent unit cells. Constraining ring 54 is constructed of a hydrophobic material, such as a hydrocarbon polymer that is at least partially fluorinated. Preferably, constraining ring 54 is constructed of a fluorocarbon polymer material such as polytetrafluoroethylene, to minimize electrolyte bridging between unit cells. With tight compression seals at juncltions 59, 60, 62, electrolyte bridging through junction 59 (between adjacent constraining rings 53 and 54), junction 61 (between constraining ring 53 and unit cell top end plate 50), junction 60 (between adjacent constraining rings 54 and 55), and junction 62 (between constraining ring 54 and unit cell bottom end plate 52) to adjacent unit cells is minimized.

Each unit cell within assembly 30 is oriented for axial current flow. Current flows in an axial direction through the electrodes, separators, screens, unit cell end plates, and cooling plates when provided. In cells having a radial current flow across the electrodes the potential drop along the radial direction may limit the size and thickness of the electrode. With an axial current flow through the unit cell, there are practically no such limitations in electrode dimensions as in cells which have the radial current flow.

The stacking of the unit cells thus defines a bipolar structure wherein serial cell connections are achieved by stacking unit cells with common end plates. An advantage of this type of structure for a larger system, over batteries wherein current flows in a radial direction, is the potential light-weight aspects of the battery through elimination of many electrical tabs and leads.

A bipolar nickel-hydrogen battery made of four unit cells of this invention was fabricated and cycle life tested to demonstrate over 4,000 cycles at 80% depth-of-discharge at ambient temperature. The battery contained four small size unit cells (30 cm² in area and 0.72 Amp-hr in capacity) without a cooling plate. Each unit cell was confined in a Teflon frame ("Teflon" being a tradename for a polytetrafluoroethylene material by DuPont Chemical Co. of Wilmington, Del.) with a vent hole and two bipolar nickel plates or one bipolar plate and one end plate. Cell components were made of a nickel mesh gas screen, a porous conductor, a sintered-type nickel electrode with 2 millimeter size holes, a zirconia fabric separator, a hydrogen electrode (a standard type for an aerospace nickel-hydrogen cell), and 31% (by weight) aqueous KOH electrolyte. The battery was continuously cycled by discharging to 80% of its nominal capacity (0.72 Amphr.) in 17.5 minutes and recharging for 110% in 27.5 minutes. The battery was cycled for over 4,000 cycles before the end-of-discharge voltage dropped considerably below 4 V.

This invention has thus been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A bi-polar nickel-hydrogen battery comprising:
   (a) a pressure vessel containing hydrogen gas; and
   (b) a plurality of unit cells located within said pressure vessel, said unit cells being stacked adjacent one another for axial current flow wherein each unit cell comprises:

(1) walls defining a unit space;
(2) a hydrogen electrode located within said cell space;
(3) a nickel electrode located within said cell space having at least one opening extending therethrough to facilitate oxygen recombination by allowing oxygen gas evolved at said nickel electrode to reach said hydrogen electrode for recombination with hydrogen gas thereat to form water within said unit cell space and to prevent $O_2$ migration outside of the unit cell;
(4) a separator disposed between said nickel and hydrogen electrodes within said cell space having means for allowing oxygen gas evolved at said nickel electrode to reach said hydrogen electrode for recombination with hydrogen gas thereat and cooperating with the nickel electrode in preventing $O_2$ migration outside of the unit cell; and
(5) an electrolyte located in said cell space about said nickel and hydrogen electrodes and said separator to permit an electrochemical reaction between said nickel and hydrogen electrodes.

2. The bipolar nickel-hydrogen battery of claim 1 wherein said separator means for oxygen recombination comprises said separator having top and bottom surfaces wherein at least one opening extends through said separator top and bottom surfaces, wherein said nickel electrode opening and said separator opening communicate to allow oxygen evolved from said nickel electrode to flow through said nickel electrode opening and said separator opening to said hydrogen electrode for recombination with hydrogen gas and such that $O_2$ migration outside the unit cell is prevented.

3. The battery of claim 2 wherein said hydrogen electrode is a porous graphite electrode having a porous platinum coating on one side thereof with said porous platinum coating facing said separator so that said hydrogen electrode separates said unit cell space into a unit cell electrolyte reservoir space on the side of said hydrogen electrode having said porous platinum coating thereon and a unit cell hydrogen gas space in the unit cell space on the side of said hydrogen electrode away from said porous platinum coating.

4. The battery of claim 3 wherein a electrically conductive gas screen is positioned within said hydrogen gas space of said unit cell space.

5. The battery of claim 2 wherein said nickel electrode is a sintered nickel electrode.

6. The battery of claim 2 wherein said walls defining a unit cell space comprise:
a hydrophobic ring defining interior and exterior radial walls; and
unit cell first and second end plates compression sealed on the top and bottom of said hydrophobic ring forming top and bottom walls, said hydrophobic ring interior radial wall and said top and bottom walls forming said unit cell space, said unit cell first and second end plates being constructed of an electrically conductive metal with said unit cell first end plate in electrical contact with said hydrogen electrode through said gas screen, said gas screen being in electrical contact with both said hydrogen electrode and said unit cell first end plate, and said hydrophobic ring extending around the periphery of said unit cell first and second end plates such that said unit cell first and second end plates are sealed from said exterior wall of said hydrophobic ring when unit cells are stacked adjacent each other.

7. The battery of claim 6 wherein a porous electrical conductor is located between said nickel electrode and said unit cell second end plate and said porous electrical conductor, being in electrical contact with said nickel electrode and said unit cell second end plate, acts as a reservoir for said electrolyte.

8. The battery of claim 7 wherein said hydrophobic ring contains a hydrogen vent extending therethrough from said unit cell exterior into the interior of said unit cell at said unit cell hydrogen gas space so that hydrogen gas can flow between said unit cell exterior and said unit cell hydrogen gas space.

9. The battery of claim 8 wherein said hydrophobic ring comprises a hydrocarbon polymer that is at least partially fluorinated.

10. The battery of claim 9 wherein said hydrophobic ring comprises polytetrafluoroethylene.

11. The battery of claim 6 wherein adjacent unit cells share common unit cell first and second end plates and a plurality of unit cells form assemblies of unit cells.

12. The battery of claim 8 further comprising:
cooling plates mounted on each of said asemblies; and
coolant fluid tubes connected to said cooling plates so that coolant fluid may pass through said cooling plates to remove heat from said assemblies, said heat being generated by unit cell electrochemical reactions.

13. A nickel-hydrogen bipolar battery comprising:
(a) a battery housing having electrical lead throughs in said housing and containing hydrogen gas therein;
(b) an assembly stack formed by a plurality of assemblies stacked adjacent each other, wherein said assembly stack has assembly first and second metallic end plates, said assembly first and second end plates for collecting electricity from said assembly stack and having electrical connections thereto which extend out of said housing through said housing lead throughs, said assemblies comprising a plurality of unit cells stacked adjacent one another so that electrical current will flow axially through said unit cells to said assembly first and second metallic end plates and out of said housing through said electrical connections and housing lead throughs, wherein each unit cell comprises:
(1) unit cell first and second metallic end plates for collecting electricity from said unit cell for electrical connection to said unit cell, said end plates being spaced by a hydrophobic dielectric member having interior and exterior walls, said hydrophobic dielectric member engaged with both of said unit cell end plates so as to hold said unit cell end plates in spaced relationship, thus forming walls that define a unit cell space between said end plates, said hydrophobic dielectric member having an opening therethrough from said exterior and interior walls to allow hydrogen gas to flow between said unit cell space and said hydrophobic dielectric member exterior, said unit cell first and second end plates being common end plates with adjacent unit cells;
(2) a porous electrical conductor contiguous said second end plate;
(3) a sintered nickel electrode contiguous said porous conductor;

(4) a separator contiguous said nickel electrode, wherein said porous conductor, said nickel electrode and said separator are partially filled with electrolyte;

(5) a porous hydrogen electrode having a porous platinum coating on one face thereof positioned so that said face is contiguous said separator and an electrically conductive gas screen positioned between and in electrical contact with said hydrogen electrode and said unit cell first end plate, wherein hydrogen gas is located in a hydrogen space within said unit cell between said platinum coating and said unit cell first end plate and said electrolyte is located between said platinum coating and said unit cell second end plate, such that said nickel electrode having at least one opening therethrough and said separator having at least one opening therethrough in communication with said nickel electrode opening so that oxygen gas, generated in said unit cell by electrolysis of said aqueous solution of electrolyte at said nickel electrode, can pass to said hydrogen electrode porous platinum coating for recombination into water which returns to said electrolyte in said unit cell, thus preventing oxygen loss into the hydrogen space.

14. The battery of claim 13 wherein an assembly of unit cells have at least one of said unit cells first or second end plates further comprising a cooling plate having means for passing coolant fluid therethrough to remove heat generated with said assembly of unit cells.

15. The battery of claim 14 wherein said means for passing coolant fluid comprises a metal plate having electrically insulated coolant fluid tubes passing through said metal plate.

16. The battery of claim 13 wherein said electrolyte is an aqueous solution of potassium hydroxide.

17. The battery of claim 13 wherein said sintered nickel electrode is comprised of a hydroxide active material.

18. The battery of claim 13 wherein said sintered nickel electrode is comprised of a nickel oxide active material.

* * * * *